United States Patent
Giroudiere et al.

(10) Patent No.: US 8,673,231 B2
(45) Date of Patent: Mar. 18, 2014

(54) EXCHANGER-REACTOR WITH BAYONET TUBES AND CHIMNEYS SUSPENDED FROM THE UPPER DOME OF THE REACTOR

(75) Inventors: Fabrice Giroudiere, Orlienas (FR); Willi Nastoll, Lyons (FR); Beatrice Fischer, Lyons (FR); Didier Pavone, Ecully (FR); Herve Lavieu, Nogent sur Marne (FR); Daniel Gonnet, Bures sur Yvette (FR); Jean-Noel Leroux, Quicny sous Senart (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 153 days.

(21) Appl. No.: 13/157,601

(22) Filed: Jun. 10, 2011

(65) Prior Publication Data
US 2012/0006516 A1   Jan. 12, 2012

(30) Foreign Application Priority Data
Jun. 11, 2010  (FR) ..................... 10 02468

(51) Int. Cl.
*B01J 8/06*   (2006.01)
*C01B 3/34*   (2006.01)

(52) U.S. Cl.
USPC ........... 422/198; 422/650; 422/651; 422/659; 422/625; 422/202; 423/650; 48/61

(58) Field of Classification Search
USPC ......... 422/198, 650, 651, 659, 625, 202, 204, 422/241, 655; 423/650, 651, 652; 48/61
See application file for complete search history.

(56) References Cited

U.S. PATENT DOCUMENTS

| 5,429,809 A | * | 7/1995 | Stahl et al. ................... 422/202 |
| 2010/0254891 A1 | | 10/2010 | Giroudiere et al. |

FOREIGN PATENT DOCUMENTS

| FR | 2918904 A1 | 1/2009 |
| WO | 2007118950 A1 | 10/2007 |
| WO | 2009141517 A1 | 11/2009 |

OTHER PUBLICATIONS

Institut National De La Propriete Industrielle. "Search Report and Written Opinion." FR1002468, Applicant: IFP, Mailed: Jan. 3, 2011.

* cited by examiner

*Primary Examiner* — Jennifer A Leung
(74) *Attorney, Agent, or Firm* — Millen, White, Zelano & Branigan, P.C.

(57) ABSTRACT

The present invention describes a vertical cylindrical exchanger-reactor for carrying out endothermic reactions, comprising a shell enclosing a plurality of tubes inside which the reactive fluid moves, said tubes being of the bayonet type, and the heat transfer fluid, in this case hot gases, being channeled inside chimneys surrounding said bayonet tubes. The bayonet tubes and the chimneys are suspended from the upper dome of the reactor. This reactor may operate with a pressure difference between the tube side and the shell of up to 100 bars. The hot gases are admitted into the reactor at temperatures of up to 1300° C.

19 Claims, 4 Drawing Sheets

Figure 1

PRIOR ART

EXCHANGER-REACTOR WITH BAYONET TUBES AND CHIMNEYS SUSPENDED FROM THE UPPER DOME OF THE REACTOR

FIELD OF THE INVENTION

The present invention relates to a exchanger-reactor consisting of a cylindrical shell closed by an upper dome, and a lower bottom, the shell enclosing a plurality of tubes of the bayonet type known as reaction tubes, inside which the chemical reaction occurs, said exchanger-reactor allowing highly endothermic reactions to be carried out such as the steam reforming of natural gas, the fluid reagent moving inside the tubes, and the heat transfer fluid, in this case hot gases, being channeled inside chimneys surrounding the bayonet tubes.

The exchanger-reactor of the invention means that reactor diameters of more than 4 meters, or more than 10 meters, and even 18 meters can be used, with a pressure difference between the inside and the outside of the reaction tubes of up to 30 bar to 100 bar, the hot gases possibly being admitted into the exchanger-reactor at temperatures of 1300° C.

The present exchanger-reactor does not employ tube plates to support the reaction tubes or the chimneys. For this reason, the system of mounting on the shell by flanges is no longer used, meaning that diameters of more than 10 meters and even up to 18 meters can be employed.

The reactor of the present invention employs a particular device for channeling the hot gases which move inside chimneys, each chimney surrounding a reaction tube.

EXAMINATION OF THE PRIOR ART

The prior art in the field of exchanger-reactors for carrying out highly endothermic reactions such as the reaction for steam reforming a hydrocarbon cut is generally represented by a type of exchanger-reactor having a system for distributing reactive fluid by means of a first tube plate and a system for collecting effluents by means of a second tube plate.

The tube plate system has been analyzed and its limitations removed by a solution described in patent FR 2 918 904 which develops a device with bayonet tubes having an inlet and an outlet for the reaction fluid or fluids outside the shell of the reactor.

In the same patent, FR 2 918 904, hot gas generally deriving from combustion carried out outside the exchanger-reactor and generating flue gases may be channeled inside tubes surrounding the bayonet tubes and termed "chimneys". Such chimneys are supported by a tube plate located in the upper portion of the reactor and which is not subjected to large pressure differences either side of it. However, that tube support plate suffers from a certain number of disadvantages which will be discussed in the next paragraph.

The tubular support plate and the reinforcing girders associated with it are subjected to high temperatures (700° C.) which may reach the limits of the material strength.

That tubular support plate for the chimneys has to be sufficiently rigid not to deform too much. Conventionally, a deformation of more than the diameter divided by 300 is avoided. As an example, for a reactor 10 meters in diameter, the maximum admissible deformation is 33 mm at the centre. This rigidity is very important in the case under consideration since the plate acts as a support for the chimney, but those tubes are displaced vertically (generally upwardly due to the pressure drop due to the flow of flue gases in the annular space), and it is important to limit this displacement which brings the risk of causing the bayonet tubes to become eccentric or of causing the deformation of the chimneys themselves.

In order to satisfy this need for rigidity, the skilled person uses reinforcing girders disposed between the various rows of the chimneys. For a reactor with an internal diameter of 10 meters, these girders are relatively large (for example approximately 500 mm high for the girder located on the reactor diameter).

Further, positioning these reinforcing girders necessitates fixing means on the shell of the reactor. This type of mounting is also expensive.

The tubular support plate, like the girders, typically expands by about 8 cm for a 10 meter diameter reactor, causing problems with alignment between the bayonet tubes suspended from the upper dome.

Another prior art problem is the service life of the chimneys subjected to radiation from very high temperature flue gases (which may reach 1300° C.) which necessitate materials which are expensive and/or fragile in long lengths (approximately 15 meters).

The present invention, which may be considered as an improvement to patent FR 2 918 904, can overcome the disadvantages of such a support plate and also increase the fraction of the length of the bayonet tubes involved in channeling hot gases.

Overall, the heat transfer efficiency between the hot gas and the reaction fluid is improved.

In the so-called HTCR reactor from Haldor Topsoe, there is a tube plate supporting the chimneys, which plate does not exist in the exchanger-reactor of the present invention.

Figure 1:
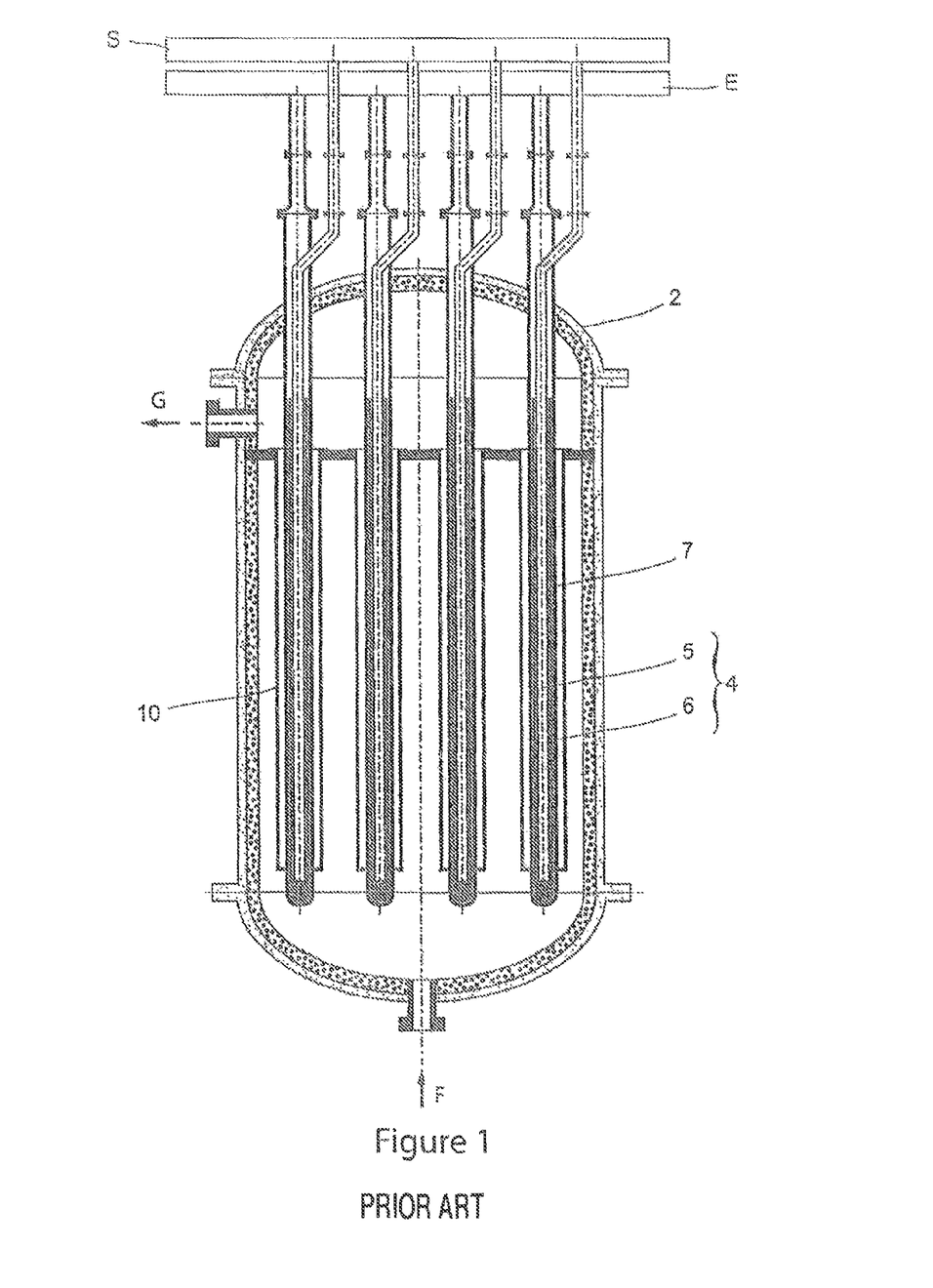
FIG. 1 represents a prior art exchanger-reactor, i.e. with a tube plate supporting the chimneys which also do not extend over the whole length of the exchanger-reactor, the hot gas being derived from combustion occurring outside the reactor.

FIG. 1 shows an exchanger-reactor, in accordance with the prior art, comprising a shell, generally cylindrical in shape, which is closed in its upper portion by an upper dome (2). The cylindrical shell (1) encloses a plurality of vertical bayonet tubes (4) with length L extending over the whole of the shell (1) and the upper dome (2). The bayonet tubes (4) are constituted by an inner central tube (5 contained in an outer tube (6), the inner central tube (5) and the outer tube (6) being substantially coaxial. The annular space (7) between the inner central tube (5) and the outer tube (6) is generally filled with catalyst. Each bayonet tube (4) is surrounded by a cylindrical tube (10) coaxial with the bayonet tube and termed the chimney. The chimneys (10), which are supported by a tube plate, do not extend over the entire length of the bayonet tubes. Hot gases are generally introduced into the shell of the exchanger-reactor via the inlet F located in the lower portion of the exchanger-reactor. The hot gases leave the reactor via an assembly of piping G (or collector) located in the upper portion of the exchanger-reactor. An inlet for the feed E is connected to the outer tubes (6) of the bayonet tubes (4), and an outlet S is connected to the inner tubes (5) of the bayonet tubes (4).

BRIEF DESCRIPTION OF THE INVENTION

The exchanger-reactor of the present invention consists of a shell with a cylindrical shape (1) closed by an upper dome (2) and a lower bottom (3) inside which the hot gas moves, said shell enclosing a plurality of parallel reaction tubes with a substantially vertical axis, inside which the reaction fluid moves, the reaction tubes (4) being of the bayonet type and having a density in the range 2 to 12 tubes per $m^2$ of reactor section, the inlet and outlet of each bayonet tube (4) being provided outside the reactor beyond the upper dome (2).

A bayonet tube (4) is defined as an assembly of an inner central tube (5) and a coaxial outer tube (6), the inner tube (5) being open at its lower end so as to allow reaction fluid to move from said inner tube (5) towards the annular zone (7) included between the inner tube (5) and the outer tube (6) or vice versa, from said annular zone towards the inner tube.

Figure 2:
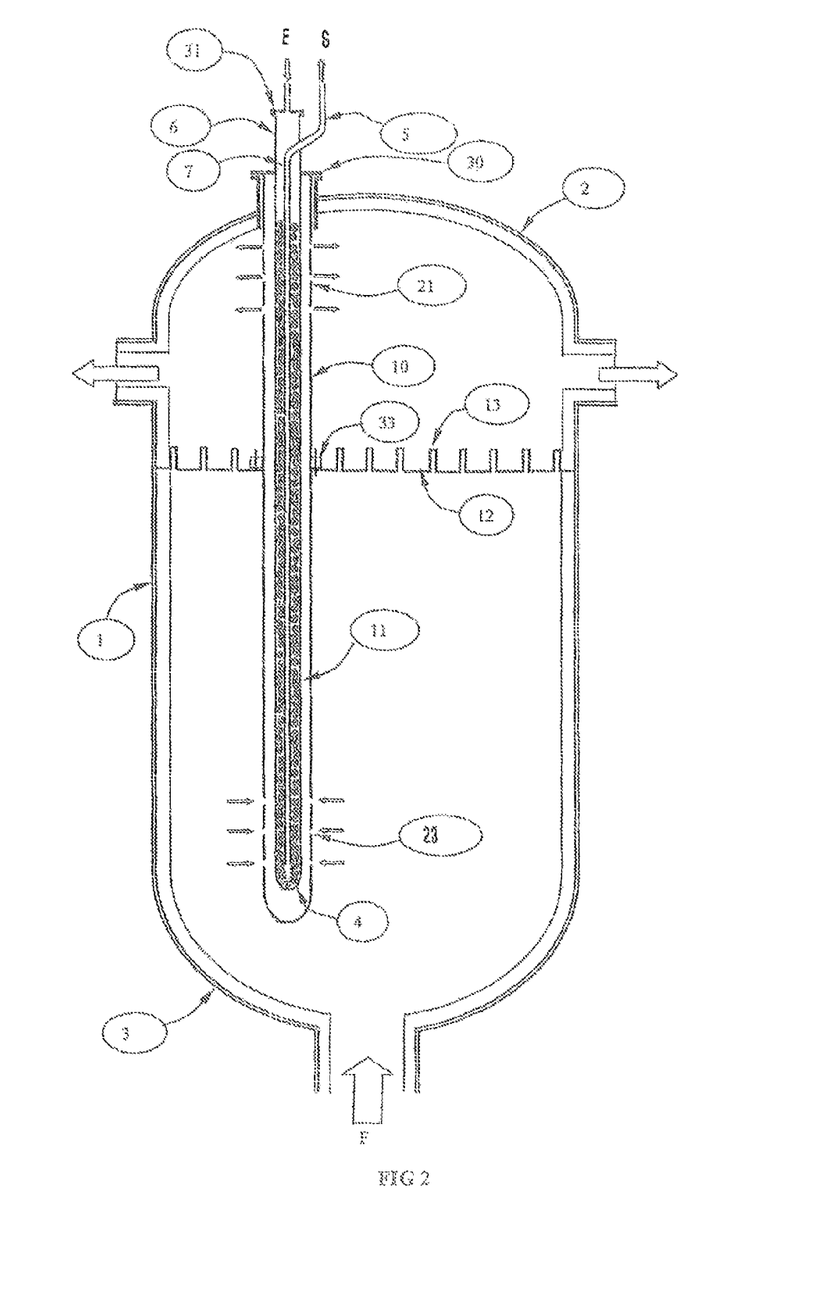
FIG. 2 represents a exchanger-reactor of the invention, i.e. with no tube plate supporting the chimneys, the chimneys extending over the entire length of the bayonet tubes and being fixed to the upper dome of the reactor.
Figure 3:
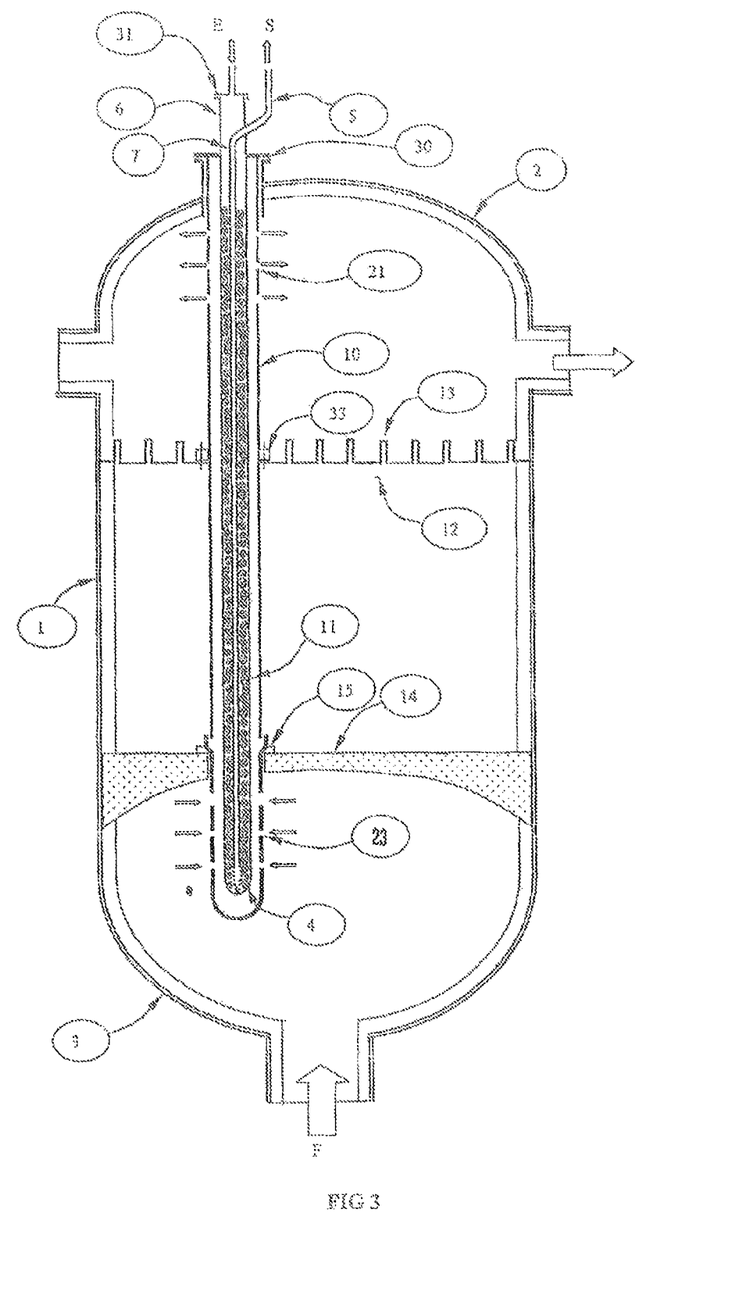
FIG. 3 represents an exchanger-reactor of the invention which is identical to that of FIG. 2 with, in addition, a lower dome which can support the lower, ceramic, portion of the chimneys.
Figure 4:
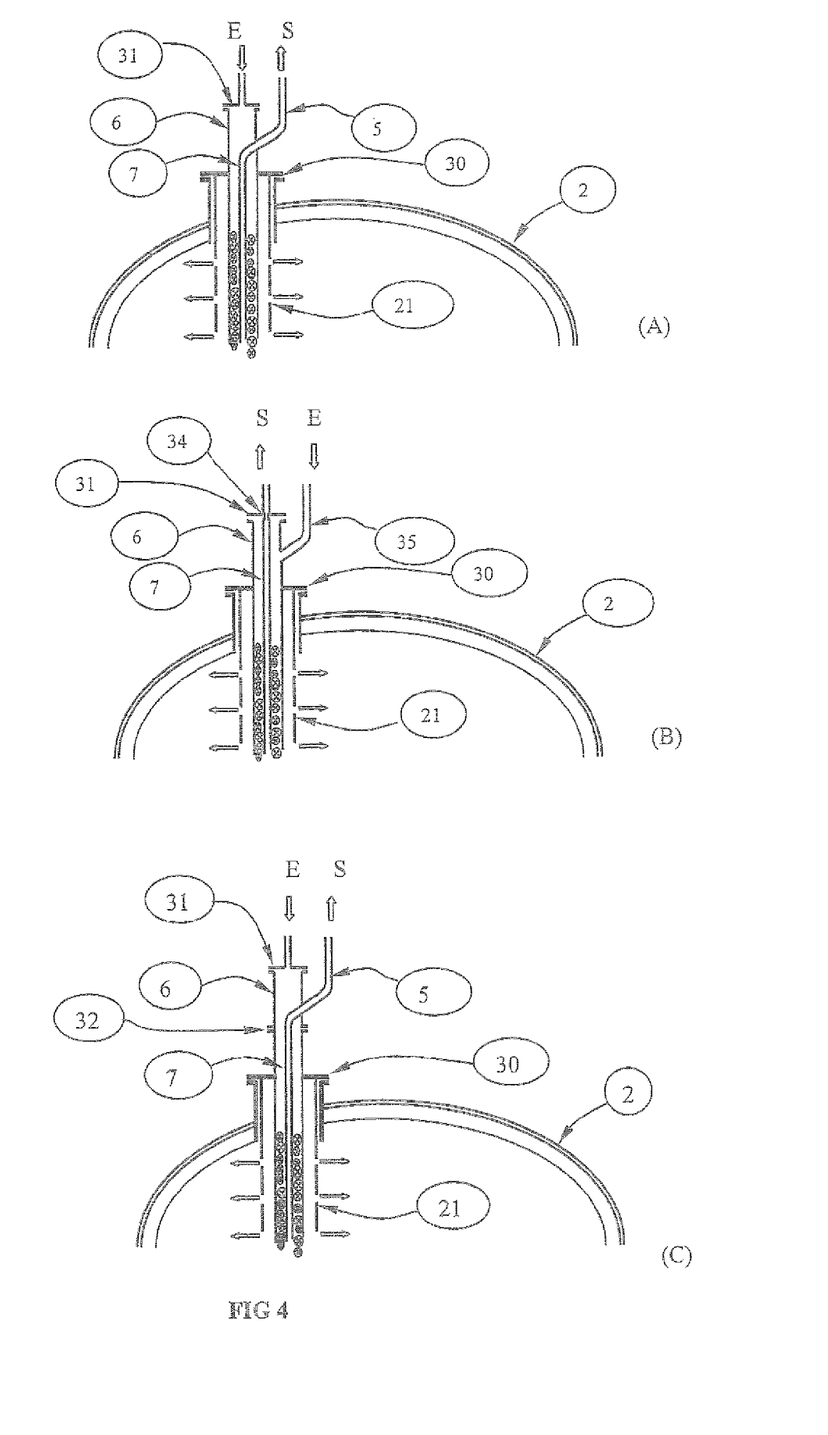
FIG. 4 represents three embodiments denoted A, B and C, for fixing the reaction tubes and chimneys at the outside of the reactor.

In an exchanger-reactor in accordance with the present invention, the inlet and outlet of each bayonet tube is outside the reactor as can be seen in FIGS. 2, 3 and 4.

The whole interior of the exchanger-reactor of the invention, i.e. the inner wall of the shell (1), the upper dome (2) and the lower bottom (3), is coated with a refractory insulating coating.

Each bayonet tube (4) is surrounded by a cylindrical tube (10) coaxial with the bayonet tube and termed the chimney, which extends over the entire length of the bayonet tube, the hot gas moving inside the annular space (11) included between the outer wall of the bayonet tube (4) and the chimney (10) at a velocity in the range 40 m/s to 75 m/s.

In the context of the present invention, the hot gas is generated by combustion occurring outside the exchanger-reactor and generating a hot fluid supplying the heat necessary for the chemical reaction, hereinafter termed the hot gas (occasionally also termed the flue gases).

The hot gas is evacuated from the upper portion of the chimneys (10) by means of a certain number of evacuation orifices (21) pierced in the wall of said chimneys.

In a variation of the invention, the hot gases are admitted into the lower portion of the chimneys (10), preferably produced from a ceramic, by means of a certain number of orifices (23). These orifices (23) may be staggered in order to bring about gradual admission of the hot gases into the interior of the chimneys (10).

The bayonet tubes (4) are preferably assembled in a triangular pattern. The spacing between each bayonet tube, or centre-to-centre distance, is generally in the range 2 to 5 times the internal diameter of the outer tube (6).

A square pattern spacing is also entirely within the scope of the present invention. In accordance with one embodiment of the present invention, the inner central tube (5) of each bayonet tube (4) passes through the outer tube (6) at a point located outside the reactor, at a distance at least 1 meter from the upper dome (2) of the exchanger-reactor, and at an angle in the range 30° to 60° with respect to the vertical. This disposition can neatly separate the inlet and outlet for each bayonet tube (4) so as to facilitate positioning of the device for distribution of the reaction fluids, and the device for collecting reaction effluents as can be seen in FIG. 1.

Several outlet arrangements for the upper dome (2) of the bayonet tubes are possible in the context of the present invention. Three possibilities are presented in FIG. 4:

type A corresponds to that just described: the inner central tube (5) of the bayonet tube (4 passes through the outer tube (6). The inlet for the feed E is via the cover flange 31 of the outer tube (6) and the outlet for effluents S is via the lateral outlet for the central tube (5). The cover flange (30) of the chimney is attached to the outer tube (6);

in another embodiment of the present invention, represented by type B in FIG. 4, the outer tube (6) is closed by a flange (31) through which the inner tube (5) passes. The inlet for the feed E is thus lateral, via the tube (35) connected to the outer tube (6), and the outlet for effluents S is via the tube (34) connected to the tube (5) in the center of the flange (31). The seal between the inner tube (5) and the outer tube (6) allowing reaction effluent to exit is provided by a tonic joint (34);

finally, in a third embodiment of the present invention, shown in type C of FIG. 4, a supplemental flange 32 can if necessary allow the central tube (5) of the bayonet (4) to be completely removed without having to dismantle the bayonet first.

Preferably, the reactive fluid is introduced via the inlet end of the annular zone 7 included between the outer tube (6) and the central inner tube (5), said annular zone (7) being at least partially filled with catalyst.

The reaction effluents are recovered via the outlet end of the central inner tube (5).

The inlet pipework for introducing E may be common to several bayonet tubes (4) and the outlet pipework for removing reaction fluid S (effluents) may be common to several bayonet tubes (4).

In general, the hot gas is constituted by combustion flue gases, said combustion taking place in a plant distinct from the present exchanger-reactor.

The hot gases are generally introduced into the shell (1) of the exchanger-reactor via the inlet pipework F located in the lower portion of said reactor.

The hot gases are channeled by the chimneys (10) surrounding each bayonet tube (4) and leave said chimneys via evacuation orifices (21) provided in the upper portion of each chimney.

The hot gases leave the reactor via an assembly of piping G (or collector) located in the upper portion of the reactor.

The chimneys (10) and the bayonet tubes (4) are fixed to the upper dome (2) of the reactor.

The concentricity of the inner tube (5) and the outer tube (6) forming the bayonet tube (4) is ensured by a multiple flexible centring device fixed to the inner tube (5) and allowing catalyst to pass through when it is charged.

Other characteristics of the exchanger-reactor of the present invention are given in the detailed description.

The invention also consists in a process for steam reforming a hydrocarbon cut using the exchanger-reactor of the present invention.

In general, the process for steam reforming a hydrocarbon cut using the exchanger-reactor of the invention is operated at a pressure between the reaction tubes and the chimneys in the range 1 to 10 bars absolute, and at a pressure inside the bayonet tubes (4) in the range 25 to 100 bars absolute.

The temperature inside the reaction tubes is generally in the range 700° C. to 950° C.

The temperature of the hot gases admitted into the exchanger-reactor may reach 1300° C.

The present invention also concerns a method for mounting an exchanger-reactor which is described in the detailed description.

DETAILED DESCRIPTION OF THE INVENTION

The exchanger-reactor of the present invention is intended to carry out highly endothermic reactions at temperatures of up to 950° C. Typically, it can be used for steam reforming hydrocarbon cuts, in particular naphtha or natural gas, with a view to the production of hydrogen.

The description below is made with reference to FIGS. 2, 3 and 4.

The exchanger-reactor of the invention is constituted by a shell (1) which is generally cylindrical in shape closed in its upper portion by an upper dome (2) which is substantially toroidal-spheroidal in shape in that the section of said upper dome may be a combination of a toroidal portion and a spherical portion, and in its lower portion by a domed bottom (3) with a substantially ellipsoidal shape. The cylindrical shell (1) encloses a plurality of vertical bayonet tubes (4) with length L extending over the whole of the shell (1) and the upper dome (2).

An open space is left between the lower end of the chimneys (10) and the lower bottom wall in order to facilitate manipulation of said tubes.

The tubes (4) are of the bayonet type, i.e. they are constituted by an inner central tube (5 contained in an outer tube (6), the inner central tube (5) and the outer tube (6) being substantially coaxial. The concentricity of the inner tube (5) and the outer tube (6) forming the bayonet tube 4 is ensured by a flexible centring device fixed to the inner tube (5) which allows catalyst to pass through it during charging.

The annular space (7) included between the inner central tube (5) and the outer tube (6) is generally filled with catalyst, said catalyst generally being in the shape of cylindrical or spherical particles, which in the case of the steam reforming reaction are typically several mm in length and several mm in diameter. The shape of the catalyst particles is not a characterizing element of the invention, which is compatible with any shape for the catalyst particles with a size allowing them to be introduced into the annular portion (7) of the vertical tubes (4).

The reaction fluid is preferably introduced into the bayonet tube (4) via the catalytic annular zone (7) the inlet end of which is outside the reactor. The steam reforming reactions occur in the catalytic annular zone and the effluents are recovered at the outlet from the central tube (5), said outlet also being located outside the reactor.

Another configuration in which the reaction fluid is introduced via the central tube (5) and the effluents are recovered from the outlet from the annular zone (7) is also possible.

The reactive fluids thus preferably move inside bayonet tubes (4), initially by descending the length of the annular zone (7) of the tube, then rising the length of the central tube (5), said tubes (4) having their inlet/outlet end located outside the exchanger-reactor, and said tubes (4) being heated by hot gases moving inside chimneys (10) surrounding each bayonet tube (4).

The hot gases may be constituted by flue gases deriving from combustion which takes place outside the exchanger-reactor. Typically, the fuel may be a hydrocarbon cut containing in the range 1 to 20 carbon atoms, or hydrogen, or a mixture of these fuels.

The fuel may comprise a varying proportion of CO and $CO_2$, possibly up to 30% molar.

The H/D ratio between the height H of the reactor and its diameter D is generally in the range 1 to 10, preferably in the range 1 to 8, and more preferably in the range 1 to 4.

The bayonet tubes (4) are surrounded by the chimney (10) which is substantially coaxial with said bayonet tubes, which can channel the hot gases around the bayonet tubes (4) at a velocity inside the chimney (10) in the range 40 m/s to 75 m/s, preferably in the range 50 m/s to 70 m/s.

The number of bayonet tubes and thus the number of chimneys per $m^2$ of the section of the reactor is generally in the range 2 to 12, and preferably in the range 3 to 8. The term "section" of the reactor means the geometric section of the reactor when empty of any internal means.

The bayonet tubes (4) usually form a triangular pattern with a centre-to-centre distance in the range 2 to 5 times, preferably in the range 2 to 3 times the internal diameter of the outer tube (6).

The invention consists in suspending the bayonet tubes (4) and the chimneys (10) on the upper dome (2) of the reactor. Thus, problems with expansion which could cause a lack of concentricity between the bayonet tubes (4) and the chimneys (10) of the prior art are overcome.

When the upper dome (2) comes up to temperature, the inter-axial distance between the various bayonet tubes (4) may change substantially without in any way causing problems with concentricity since the chimneys (10) are suspended at the same level as the bayonet tubes (4), i.e. at the upper dome (2); in a variation, they use the same flange fixing device as the bayonet tubes (4).

This attachment by flanges is shown in more detail in FIGS. 4a, 4b and 4c which correspond to several embodiments of the outlet for the bayonet tubes (4) and the chimneys (10) outside the reactor.

Since flange mounting is well known to the skilled person, this will not be described in further detail.

In order to allow hot gases to be evacuated from the chimneys (10) to the shell (1), evacuation orifices (21) are provided in the upper portion of the chimneys (10). These evacuation orifices may have a variety of shapes, rectangular or curvilinear, in particular circular, and may be staggered at different heights along the chimney (10) so that they do not weaken said chimneys (10).

The device is completed by a "sealing" plate (12) which uses the chimneys (10) for attachment. This sealing plate (12) may be constituted by a plurality of elements in order to be able to accommodate deformations due to thermal expansion without consequences for the chimneys (10).

This sealing plate is supported by the chimneys (10) themselves, which means that costs can be reduced compared with a self-supporting sealing plate or a sealing plate supported by girders.

The expansion allowances are, for example, produced as folds (13) which are advantageously orientated upwardly in order to prevent debris from getting into the folds and preventing thermal expansion.

In order to prolong the service life of the chimneys (10) and to reduce the costs of the materials required to produce them, in a variation the present invention envisages the preferred use of two different materials, selected as a function of the local temperature of the flue gases, for producing them.

In this variation, the upper portion of the chimneys (10) is metallic and the lower portion of said chimneys (10) is formed from ceramic. The term "upper portion" means the portion of the tube which extends from the upper dome (2) to the junction with the lower, ceramic, portion.

In accordance with the invention, the upper metallic portion is suspended at the level of the upper dome (2), while the lower ceramic portion is fastened to a brick dome (14) located in the lower portion of the reactor. This brick dome (14) can be seen in FIG. 3.

Preferably, the internal diameter of the ceramic portion of the chimneys (10) is slightly larger than the external diameter of the metallic portion of said tubes (10), in order to allow the metallic portion to slide inside the ceramic portion, thus allowing a "flexible" junction between the two portions which can also overcome problems with differential expansion of the metallic and ceramic portions.

The lower dome (14) is preferably constituted by refractory brick elements leaving the necessary passages for the lower ceramic portion of the chimneys (10), which will hang beneath the dome, preferably by 2 m to 5 m and more preferably 2 m to 4 m below said dome.

In this manner, radiation from the very hot flue gases at the bottom of the reactor is blocked by the refractory dome (14) and by the ceramic chimneys (10) which completely surround the bayonet tubes.

The metallic portion of the chimneys (10) located above the dome (14) thus experience much lower temperatures which means that cheaper metals can be used for said metallic portion.

In a preferred mode of assembly shown in FIG. 3, the upper portion of the lower dome (14) is flat and placed on this dome are square collars (15) formed from ceramic of the self-locking form, which means that the ceramic tubes can be locked in place after sliding them downwards and turning them by a fraction of a turn. These chimneys (10) formed from ceramic may advantageously be constituted by several sections in order to facilitate positioning them.

The scope of the invention also encompasses producing the lower dome (14) from refractory concrete.

The dome (14) does not have to be rigorously tight to flue gases, since the movement of the flue gases is blocked by the sealing plate (12) placed in the upper portion of the exchanger-reactor. Thus, all of the flue gases are admitted into the chimneys (10) via the admission orifices (23).

The ceramic chimneys are provided with admission orifices (23 of various shapes, for example rectangular or circular, disposed at different levels along the chimney (10). These fume admission orifices (23) are located below the level of the dome (14).

The chimneys (10) are also provided with orifices (21) for evacuating flue gases located in the upper portion, and thus the metallic portion, of said tubes (10).

These evacuation orifices (21) are located above the sealing plate (12).

When the temperature of the hot gases drops below 800° C., the chimneys may be provided with ribs or pins generally fixed to the wall of the outer reaction tube (6).

The effect of these ribs is to increase the heat transfer coefficient between the hot gases moving inside the chimneys (10) and the reaction fluid moving inside the bayonet tubes (4).

Overall, this increase in the heat transfer coefficient may have the result of reducing the length of the bayonet tubes (4) and the chimneys (10) and thus make the reactor more compact, insofar as its H/D (height to diameter) ratio is reduced.

The exchanger-reactor of the invention is preferably assembled by following the following principal steps:
1) transporting the complete reactor, i.e. shell+lower bottom+upper dome+keying for insulator;
2) transporting ready-assembled bayonet tubes (4);
3) producing the lower dome (14) from brick;
4) placing thermal insulation on the assembly of the inner wall of the shell (1), the upper dome (2) and the lower bottom (3);
5) producing a sealing plate (12), leaving open passages for the chimneys (10);
6) positioning the lower ceramic portions of the chimneys (10);
7) assembling the upper metallic portion of the chimneys (10) from the top, engaging the lower end inside the ceramic portion which is already in place, and attaching the sealing plate;
8) introducing the bayonet tubes (4) into the chimneys (10) and fixing said tubes (4) and (10) to the upper dome (2);
9) installing the linking collectors A and S;
10) charging catalyst into the bayonet tubes (4).

COMPARATIVE EXAMPLE

The comparative example below shows the advantage of extending the chimneys (10) towards the upper dome since heat exchange is improved, and for this reason slightly cooler flue gases can be used, i.e. 15° to 20° lower compared with the prior art.

In the first case, a prior art reactor as shown in FIG. 1 is used and in a second case, the reactor of the present invention as shown in FIG. 2 is modified.

In the case in accordance with the invention, the chimneys (10) are extended towards the top of the reactor up to the upper dome (3).

The exchanger-reactor was intended to produce 94000 $Nm^3$/hour of $H_2$ by steam reforming natural gas.

on the shell side, the flue gases from combustion occurring outside the exchanger-reactor have the following composition, in % molar:

| | |
|---|---|
| $H_2O$ | 12.72% |
| $O_2$ | 6.91% |
| $CO_2$ | 13.42% |
| $N_2$ | 66.16% |
| Ar | 0.79% |

The inlet temperature for the flue gases was 1286° C. in the two cases (prior art and in accordance with the invention) in order to obtain 900° C. at the lower end of the bayonet tubes (catalyst outlet).

Pressure of flue gases at inlet: $4.3 \times 10^5$ Pa;

Total flue gases flow rate was 13470 kmole/h (k is the abbreviation for kilo, i.e. $10^3$);

On the tube side, the composition in % molar of the feed to be treated is as follows:

| | |
|---|---|
| $H_2O$ | 69.23% |
| $CH_4$ | 28.53% |
| $C_2H_6$ | 2.24% |

The pressure at the inlet to the bayonet tubes is 30 bars and the temperature is 432° C.;

The principal dimensions of the exchanger-reactor of the invention are as follows:

Reactor diameter: 10.4 m;

Total height of bayonet tubes: 18.1 m;

Length over which heat exchange occurs between the bayonet tubes 4 and the flue gases accelerated in the chimneys 10:

Case 1 (prior art): 15.5 m;

Case 2 (invention): 17 m;

Number of bayonet tubes (and chimneys): 328;

Rate of circulation of flue gases inside chimneys: 75 to 45 m/s;

The bayonet tubes and the chimneys are suspended from the upper dome of the reactor via a system of flanges, as shown in FIG. 3.

The table below compares the thermal performances for case 1 (prior art) with case 2 (in accordance with the invention).

The outlet temperature of the flue gases was reduced to 661° C. in the case of the invention, as opposed to 680° C. in the prior art, which results in better efficiency of heat exchange. This effect is a direct result of extending the chimney length.

The invention may also use slightly cooler flue gases and thus reduce the strain on the metalwork of the bayonet tubes by reducing the skin temperature thereof. This impact is economically important for reactors which may contain up to 400 bayonet tubes.

TABLE 1

|  | Case 1 (prior art) | Case 2 (in accordance with the invention) |
| --- | --- | --- |
| Temperature, flue gas inlet | 1286° C. | 1286° C. |
| Temperature, flue gas outlet | 680° C. | 661° C. |
| Temperature, feed inlet | 432° C. | 432° C. |
| Temperature, catalyst outlet | 900° C. | 900° C. |
| Temperature, product outlet | 571° C. | 579° C. |
| Max temperature, metal | 1051° C. | 1043° C. |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding FR application Ser. No. 10/02.468, filed Jun. 11, 2010, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An exchanger-reactor comprising:
a shell (1) with a cylindrical shape having a lower portion and an upper portion, said shell being closed by an upper dome (2), and a lower bottom (3), wherein said shell further comprises an opening (F) located in said lower bottom (3), and a lateral opening (G), and the assembly of said shell, lower bottom and upper dome being coated with a refractory insulating coating,
a plurality of parallel bayonet tubes (4) enclosed within said shell (1), said bayonet tubes (4) having a substantially vertical axis extending from said lower portion of said shell (1) to said upper dome (2), inside which reaction fluid moves,
each bayonet tube (4) being surrounded over its entire length with a chimney (10), wherein admission orifices (23) are pierced in the wall of each chimney and evacuation orifices (21) are provided in the upper portion of each chimney, the inlet and the outlet of each bayonet tube being outside the exchanger-reactor, beyond said upper dome (2), and each bayonet tube (4) and its surrounding chimney (10) being suspended from said upper dome (2) of said exchanger-reactor
wherein hot gases generated outside said exchanger-reactor can be introduced into said shell (1) via said opening (F), and the hot gases can then enter the chimneys (10) via said admission orifices (23), can exit said chimneys (10) via said evacuation orifices (21), and can be evacuated from said exchanger-reactor via said lateral opening (G).

2. The exchanger-reactor according to claim 1, wherein each bayonet tube (4) and its surrounding chimney (10) are fixed to said upper dome (2) via a system of flanges (30, 31, 32).

3. The exchanger-reactor according to claim 1, wherein each of said bayonet tube (4) is an assembly of an inner central tube (5) and a coaxial outer tube (6), and the center-to-center distance between adjacent bayonet tubes (4) is in the range of 2 to 5 times the internal diameter of the outer tube (6).

4. The exchanger-reactor according to claim 3, wherein the center-to-center distance between adjacent bayonet tubes (4) in the range of 2 to 3 times the internal diameter of the outer tube (6).

5. The exchanger-reactor according to claim 1, wherein each chimney (10) is divided into an upper metallic portion and a lower ceramic portion.

6. The exchanger-reactor according to claim 5, wherein a dome (14) formed from refractory bricks covering the entire section of the exchanger-reactor is located at the junction between the lower ceramic portion and the upper metallic portion of the chimneys (10), said dome (14) formed from refractory bricks allowing the passage of said chimneys (10).

7. The exchanger-reactor according to claim 6, wherein a sealing plate (12) is located in the upper portion of the exchanger-reactor and is fixed to the chimneys (10), and said admission orifices (23) are provided in the lower portions of said chimneys (10), below the level of said dome (14) formed from refractory bricks, and said evacuation orifices (21) are provided in the upper portions of said chimneys (10), above the level of the sealing plate (12).

8. The exchanger-reactor according to claim 6, wherein the lower ceramic portions of said chimneys (10) hang 2 m to 5 m below said dome (14) formed from refractory bricks.

9. The exchanger-reactor according to claim 5, wherein the internal diameter of the lower ceramic portion of the chimneys (10) is slightly larger than the external diameter of the upper metallic portion of said chimneys (10), in order to allow the upper metallic portion to slide inside the lower ceramic portion and thereby adjust for differential expansion of the metallic and ceramic portions.

10. The exchanger-reactor according to claim 1, wherein a sealing plate (12) is located in the upper portion of the exchanger-reactor and is fixed to the chimneys (10).

11. The exchanger-reactor according to claim 10, wherein the sealing plate (12) has a certain number of folds (13) to allow for thermal expansion.

12. The exchanger-reactor according to claim 1, wherein the number of said bayonet tubes is in the range of 2 to 12 tubes per $m^2$ of reactor section.

13. The exchanger-reactor according to claim 12, wherein the number of bayonet tubes per $m^2$ of the section of the reactor is in the range of 3 to 8.

14. The exchanger-reactor according to claim 1, wherein the ratio of the reactor height H to the reactor diameter D is 1 to 10.

15. A process for steam reforming a hydrocarbon cut comprising:
   introducing steam and the hydrocarbon cut to be reformed into the bayonet tubes (4) of an exchanger-reactor according to claim 1, and
   heating said bayonet tubes (4) by combustion flue gases, said combustion flue gases being generated outside said exchanger-reactor by combustion of a fuel constituted by a hydrocarbon cut containing in the range 1 to 20 carbon atoms.

16. A process for steam reforming a hydrocarbon cut comprising:
   introducing steam and the hydrocarbon cut to be reformed into the bayonet tubes (4) of an exchanger-reactor according to claim 1, wherein the pressure between the bayonet tubes and the chimneys is in the range of 1 to 10 bars absolute, and the pressure inside the bayonet tubes is in the range of 25 to 100 bars absolute.

17. A process for steam reforming a hydrocarbon cut comprising:
   introducing steam and the hydrocarbon cut to be reformed into the bayonet tubes (4) of an exchanger-reactor according to claim 1, wherein the rate of circulation of hot gases inside the chimneys (10) is in the range 40 m/s to 75 m/s.

18. The process for steam reforming a hydrocarbon cut according to claim 17, wherein the rate of circulation of the hot gases inside the chimneys (10) is in the range 50 to 70 m/s.

19. A method for assembling an exchanger-reactor according to claim 1, comprising:
   1) providing the assembly comprising the shell with the lower bottom and the upper dome;
   2) providing ready-assembled bayonet tubes (4);
   3) placing the refractory insulating coating on the inner wall of the assembly of the shell (1), the upper dome (2) and the lower bottom (3); and
   4) introducing the bayonet tubes (4) into the chimneys (10) and fixing said tubes (4) and chimneys (10) to the upper dome (2).

* * * * *